(12) United States Patent
Takahashi et al.

(10) Patent No.: US 8,717,630 B2
(45) Date of Patent: May 6, 2014

(54) IMAGE PROCESSING APPARATUS AND IMAGE PROCESSING METHOD A THINNING RATIO APPLIED WHEN AN IMAGE OBJECT HAS A FIRST SIZE IS SMALLER THAN A THINNING RATIO APPLIED WHEN AN IMAGE OBJECT HAS A SECOND SIZE SMALLER THAN THE FIRST SIZE

(75) Inventors: Nobukazu Takahashi, Misato (JP); Yasunori Fujimoto, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 12/895,348

(22) Filed: Sep. 30, 2010

(65) Prior Publication Data

US 2011/0085208 A1   Apr. 14, 2011

(30) Foreign Application Priority Data

Oct. 13, 2009   (JP) ................ 2009-236437

(51) Int. Cl.
*H04N 1/407* (2006.01)

(52) U.S. Cl.
USPC ....................... 358/3.26; 358/3.27

(58) Field of Classification Search
None
See application file for complete search history.

(56) References Cited

U.S. PATENT DOCUMENTS 6,753,976 B1 * 6/2004 Torpey et al. ............. 358/1.9
2007/0153046 A1 * 7/2007 Kanematsu et al. ........ 347/19

FOREIGN PATENT DOCUMENTS

JP   2007-176158 A   7/2007

* cited by examiner

*Primary Examiner* — Firmin Backer
*Assistant Examiner* — Christopher D Wait
(74) *Attorney, Agent, or Firm* — Canon U.S.A., Inc. IP Division

(57) ABSTRACT

If a non-edge part of an image is thinned at a constant thinning ratio regardless of an image size (a character size or a line image width), a reduction in image density in the non-edge part becomes more conspicuous with increasing image size, which can lead to a reduction in image quality. In view of the above, the thinning ratio at which to thin data in the non-edge part of the image is determined depending on the image size. The thinning ratio is set to be smaller for images with sizes greater than or equal to a predetermined value than for images with sizes smaller than the predetermined value such that a high-quality image with sufficiently high density in its non-edge part is obtained regardless of the image size.

12 Claims, 13 Drawing Sheets

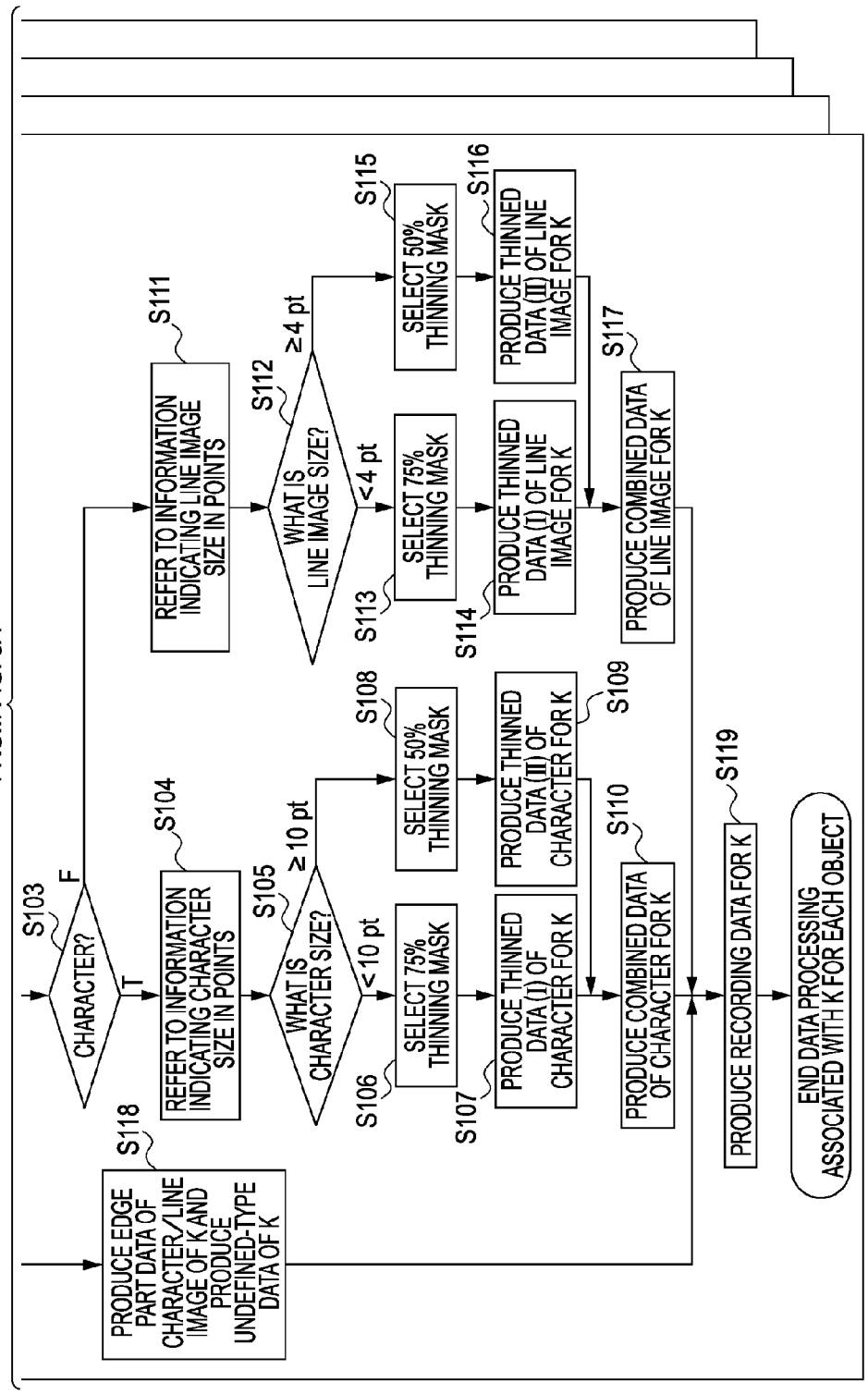

PIXEL OF INTEREST

PIXEL OF INTEREST

FIG. 11

| FONT NAME | VARIABLE |
|---|---|
| POP | 4.0 |
| GOTHIC | 2.5 |
| MINCHO | 1.0 |
| BLOCK | 3.2 |
| SEMI-CURSIVE | 2.0 |
| Arial | 1.7 |
| Times New Roman | 1.5 |
| Century | 1.6 |

IMAGE PROCESSING APPARATUS AND IMAGE PROCESSING METHOD A THINNING RATIO APPLIED WHEN AN IMAGE OBJECT HAS A FIRST SIZE IS SMALLER THAN A THINNING RATIO APPLIED WHEN AN IMAGE OBJECT HAS A SECOND SIZE SMALLER THAN THE FIRST SIZE

BACKGROUND OF THE INVENTION

1. Field of the Invention

The present invention relates to an image processing apparatus and an image processing method capable of performing a process to reduce the amount of a recording material used to form a non-edge part of an image.

2. Description of the Related Art

Japanese Patent Laid-Open No. 2007-176158 discloses a technique to achieve both high image quality and a low running cost by reducing the amount of a recording material (the number of dots formed with the recording material) while maintaining the high image quality. In this technique according to Japanese Patent Laid-Open No. 2007-176158, data of a non-edge part of an image is thinned by a particular thinning ratio thereby achieving a reduction in the amount of the recording material (the number of dots formed with the recording material) while maintaining high image quality whereby a reduction in the running cost is achieved.

However, in the technique disclosed in Japanese Patent Laid-Open No. 2007-176158, the non-edge part is thinned according to a constant thinning ratio regardless of an image size (such as a character size, a line image width, etc.). This causes a low image density of the non-edge part to become more conspicuous with increasing image size, which can cause a reduction in image quality.

SUMMARY OF THE INVENTION

In view of the above, the present invention provides a technique to reduce the amount of a recording material used to form a non-edge part of an image while maintaining high image quality regardless of an image size.

According to aspect of the present invention, an image processing apparatus includes an acquisition unit configured to acquire information associated with a size of an image, a determination unit configured to determine a thinning ratio at which data of a non-edge part of the image is to be thinned according to the information acquired by the acquisition unit, and a thinning unit configured to thin the data of the non-edge part according to the thinning ratio determined by the determination unit, wherein the determination unit determines the thinning ratio such that the thinning ratio applied when the image has a first size is smaller than the thinning ratio applied when the image has a second size smaller than the first size.

Thus, the present invention makes it possible to reduce the amount of a recording material used to form a non-edge part of an image while maintaining high image quality regardless of an image size.

Further features of the present invention will become apparent from the following description of exemplary embodiments with reference to the attached drawings.

BRIEF DESCRIPTION OF THE DRAWINGS

FIGS. 5A to 5B together form a flow chart illustrating a data processing sequence performed for each object.

FIG. 11 is a font-variable table according to an embodiment of the present invention.

DESCRIPTION OF THE EMBODIMENTS

Figure 1:
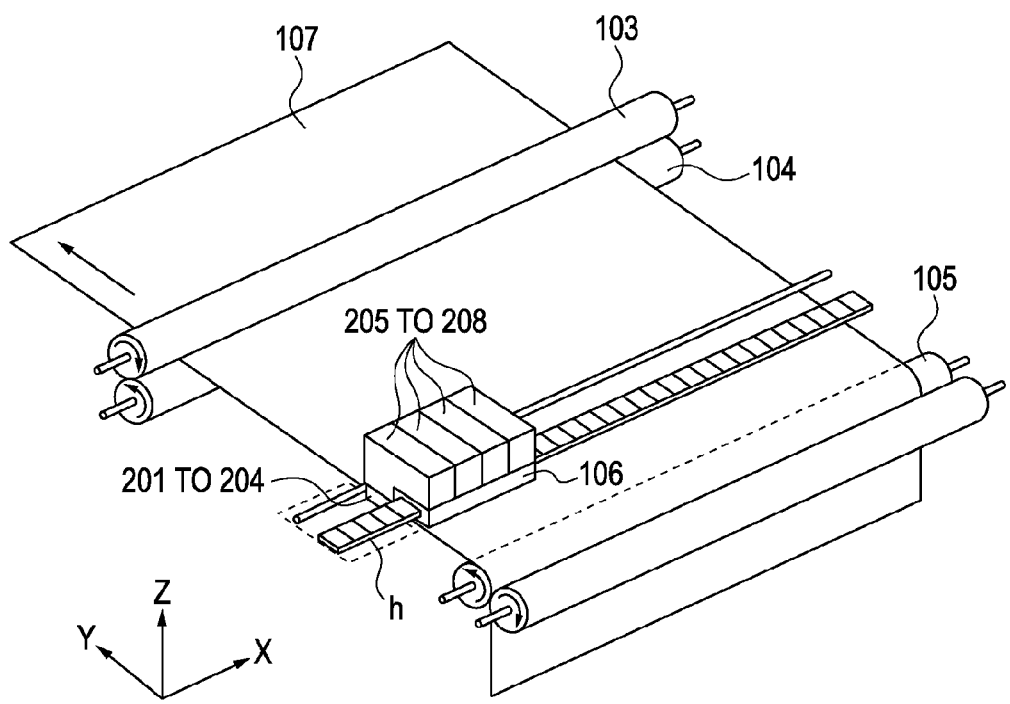
FIG. 1 is a perspective view illustrating a structure of an ink-jet recording apparatus.

FIG. 1 is a perspective view of a color ink-jet recording apparatus according to an embodiment of the present invention. Ink tanks 205 to 208 are configured to store ink of four colors (black (K), cyan (C), magenta (M), and yellow (Y)) therein and provide these inks to corresponding recording heads 201 to 204 of four colors. The recording heads 201 to 204 are disposed for respective inks of four colors such that ink of a particular color supplied from a corresponding one of the ink tanks 205 to 208 is ejected from the recording heads 201 to 204.

A conveying roller 103 cooperates with an auxiliary roller 104 to hold and convey a recording medium (recording paper) 107 such that the recording medium 107 is nipped between the conveying roller 103 and the auxiliary roller 104 and the recording medium 107 is conveyed by rotation of the conveying roller 103 and the auxiliary roller 104. A carriage 106 is configured to allow the ink tanks 205 to 208 and the recording heads 201 to 204 to be installed thereon. The carriage 106 can move back and forth in an X direction while holding these recording heads and the ink tanks thereon. As the carriage 106 moves back and forth, ink is ejected from the recording heads to form an image on the recording medium. Note that during a non-recording operation such as an operation of recovering the recording heads 201 to 204, the carriage 106 is controlled to be located at a home position h represented by a broken line in FIG. 1.

When the recording heads 201 to 204 are at the home position h shown in FIG. 1, if a record start command is issued, the recording heads 201 to 204 move together with the carriage 106 in the X direction and ink is ejected from the recording heads 201 to 204 thereby forming an image on the recording medium 107. Each time the recording heads move once over a full scanning length, recording is performed in an area with a width corresponding to a length of an array of ejection ports of the recording head 201. If the recording by scanning the carriage 106 once in the main scanning direction (X direction) is completed, the carriage 106 is returned to the home position h. Thereafter, the recording heads 201 to 204 are again scanned in the X direction as shown in FIG. 1 whereby recording is performed again. Before a next scan-and-record operation is started after the previous scan-and-record operation is complete, the conveying roller 103 rotates to convey the recording medium in a sub scanning direction (Y direction) perpendicular to the main scanning direction. By performing recording by scanning the recording heads and conveying the recording medium repeatedly in the above-described manner, a complete image is formed on the recording medium 107. The operation of recording by ejecting ink from the recording heads 201 to 204 is controlled by a control unit described later.

In the example described above, it is assumed that recording is performed only when the recording heads move in a forward direction, i.e., recording is performed in a one-way recording mode. However, the present invention is also applicable to two-way recording in which recording is performed when the recording heads move in both directions, i.e., in forward and backward directions. In the example described above, it is also assumed that the ink tanks 205 to 208 and the recording heads 201 to 104 are separately mounted on the carriage 106. Alternatively, each of the ink tanks 205 to 208 may be integrated with a corresponding one of the recording heads 201 to 204 into a cartridge, and cartridges may be mounted on the carriage. Alternatively, heads described above may be integrated into a single head and may be mounted on the carriage such that a plurality of colors of ink are ejected from the single head.

Figure 2:
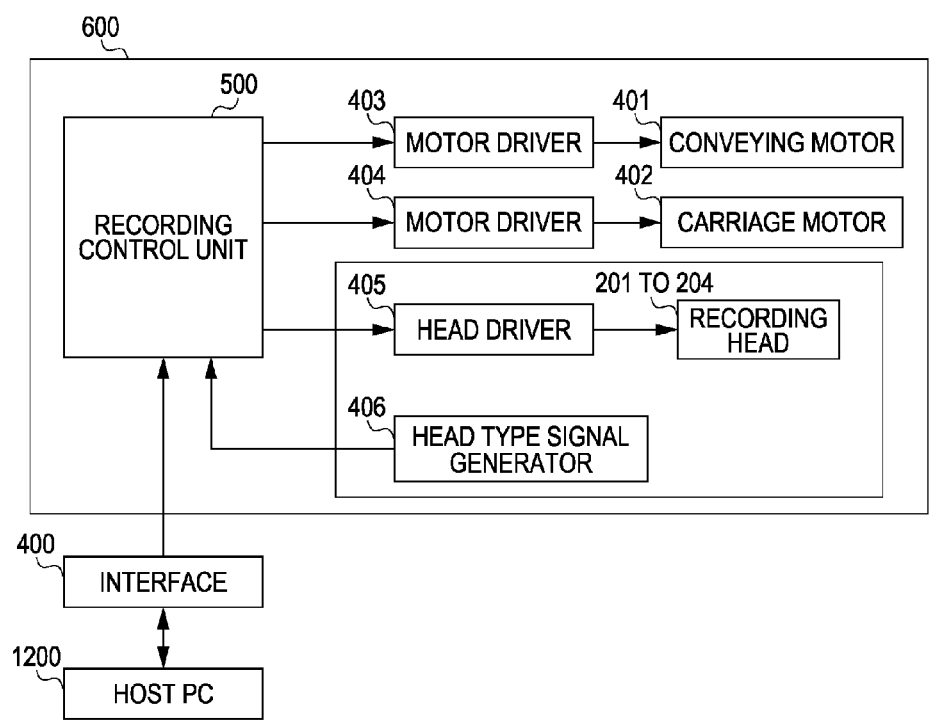
FIG. 2 is a block diagram illustrating a configuration of a recording control circuit in an ink-jet recording apparatus.

FIG. 2 is a block diagram illustrating a configuration of a recording control circuit in the color ink-jet recording apparatus shown in FIG. 1. The ink-jet recording apparatus 600 is connected to a data supply apparatus such as a host computer (host PC) 1200 via an interface 400. Various kinds of data and control signals used in recording are transmitted from the data supply apparatus and are input to a recording control unit 500 in the ink-jet recording apparatus 600. According to the control signals input via the interface 400, the recording control unit 500 controls units such as motor drivers 403 to 404 and head drivers 405 that will be described below. The recording control unit 500 also performs processing (such as data processing described below with reference to FIGS. 4 and 5) on input image data and performs processing on a signal input from a head type signal generator 406 described below. A convey motor 401 serves to rotate the conveying roller 103 to convey the recording medium 107. A carriage motor 402 serves to move the carriage 106 back and forth together with the recording heads 201 to 204 mounted thereon. Motor drivers 403 and 404 serve to drive the conveying motor 401 and the carriage motor 402, respectively. Head drivers 405 serve to drive the recording heads 201 to 204. Note that as many head drivers 405 are disposed as there are recording heads. A head type signal generator 406 serves to supply a signal indicating the types and number of the recording heads 201 and 204 mounted on the carriage 106 to the recording control unit 500.

First Embodiment

The present invention is described in further detail below with reference specific embodiments. In a first embodiment, attribute information associated with an image is checked to identify an attribute of the image. The attributes indicated by the attribute information include a character, a line image, and an undefined type (other than the character and the line image). In a case where the attribute of the image is identified as a character or a line image (i.e., the image is of a character type or a line image type), a non-edge part of this image is detected. Subsequently, point number information indicating the size of the character or the line image in units of points is acquired and a thinning mask for thinning the non-edge part is selected according to the point number information associated with the character or the line image. Note that in the present description, the point number refers to a value indicating a size in units of points. More specifically, in a case where the point number associated with the character or the line image is smaller than a threshold value (a predetermined particular point number), that is, in a case where the image size is smaller than a predetermined particular size, a thinning mask with a high thinning ratio is selected. On the other hand, in a case where the point number associated with the character or the line image is greater than or equal to the threshold value (the predetermined particular point number), that is, in a case where the image size is greater than or equal to the predetermined particular size, a thinning mask with a low thinning ratio is selected. By properly adjusting the thinning ratio applied to the non-edge part depending on the size of the image (the character or the line image, in this case) in the above-described manner, it is possible to suppress degradation in image quality due to a reduction in image density in large-size images. This effect is described in further detail below with reference to FIGS. 3A to 3F.

Figure 3A:
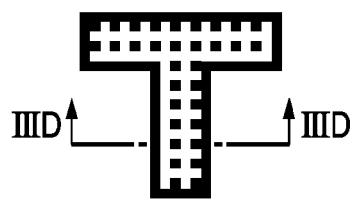
FIGS. 3A to 3C are diagrams illustrating examples of thinned images.
Figure 3B:
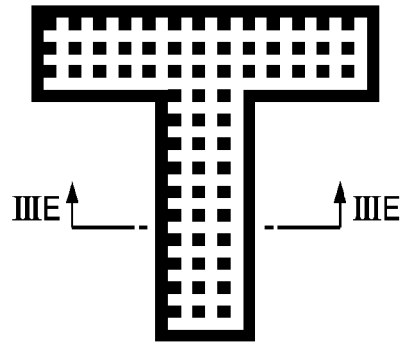
Figure 3C:
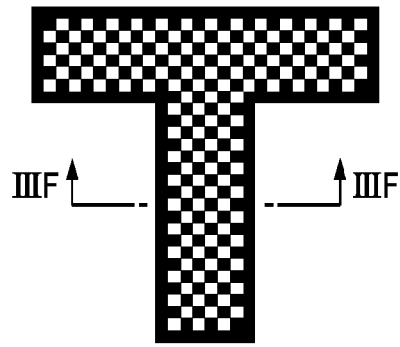
Figure 3D:
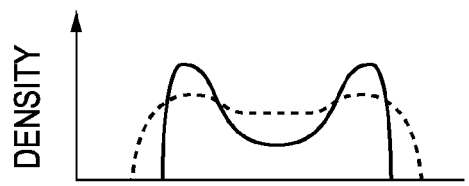
FIGS. 3D to 3F are diagrams illustrating density distributions in the images shown in FIGS. 3A to 3C.
Figure 3E:
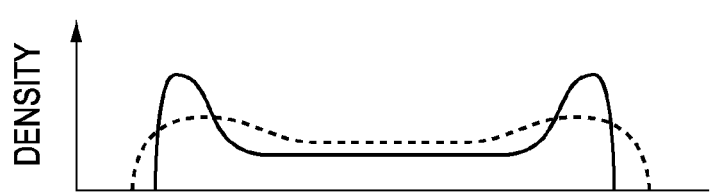
Figure 3F:
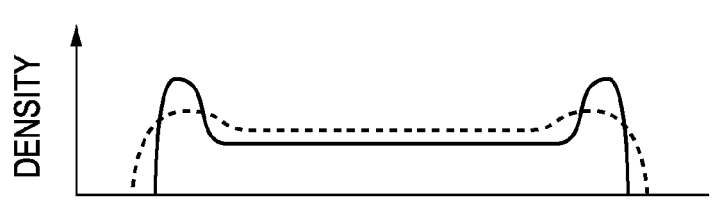

FIGS. 3A to 3C illustrate examples of images obtained by thinning non-edge parts (parts surrounded by edges) of images (hereinafter, referred to as thinned non-edge part images). Note that in the present description, "thinning" refers to reducing of data of pixels. FIGS. 3D to 3F illustrate density distributions in the images shown in FIGS. 3A to 3C. More specifically, FIG. 3A illustrates a thinned non-edge part image obtained from a small image by thinning its non-edge part at a particular thinning ratio. FIG. 3B illustrates a thinned non-edge part image obtained from a large image by thinning its non-edge part at the same thinning ratio as that applied to FIG. 3A. FIG. 3C illustrates a thinned non-edge part image obtained from the large image by thinning its non-edge part at a smaller thinning ratio than that applied to FIG. 3A. FIG. 3D illustrates a density distribution along line IIID-IIID of FIG. 3A. FIG. 3E illustrates a density distribution along line IIIE-IIIE of FIG. 3B. FIG. 3F illustrates a density distribution along line IIIF-IIIF of FIG. 3C. Note that in FIGS. 3D to 3F, solid lines indicate optical densities of the respective images. Human eyes can perceive a density in a range of 0 to 8 cycles/mm. For example, in the case of an image formed by a printer with a resolution of 1200 dpi, human eyes can perceive a density of an area with a width corresponding to 6 pixels. This means that human eyes perceive an average density of pixels around a point of interest. In view of the above, in FIGS. 3D to 3F, broken lines indicate moving averages of optical densities of pixels around points of interest, i.e., apparent densities (macroscopic densities) of images as viewed macroscopically.

In a middle range of FIG. 3D, the optical density in the edge part affects the macroscopic density in the non-edge part of the small image, and thus the macroscopic density in the non-edge part is higher than the optical density of the non-edge part. In middle ranges of FIGS. 3E and 3F, the macroscopic densities in non-edge parts of large images are less influenced by the optical densities of the edge parts than the macroscopic density of the small images because of a greater distance between the edge and the center of the image. This leads to a small difference between the macroscopic density and the optical density in the non-edge part. Therefore, when the optical density in the non-edge part is equal for FIG. 3D and FIG. 3E, the macroscopic density of the non-edge part in FIG. 3D can be different from that shown in FIG. 3E. In the case of FIG. 3F, because the thinning ratio applied to the non-edge part is lower than that in FIG. 3E, a higher optical density is obtained in FIG. 3F than in FIG. 3E, and thus the macroscopic density in the non-edge part in FIG. 3F is higher than that in FIG. 3E.

In other words, to obtain a large image with a macroscopic density similar to that of a small image shown in FIG. 3D, the optical density shown in FIG. 3E is not high enough. The optical density has to be as high as shown in FIG. 3F. That is, when the image area is large as with the case shown in FIG. 3F, the thinning ratio applied to the non-edge part is set to be low enough to achieve a macroscopic density similar to that shown in FIG. 3D. By setting the thinning ratio such that a lower thinning ratio is applied to a non-edge part of a great image than that applied to a non-edge part of a small image as described above, it is possible to suppress a reduction in optical density (macroscopic density) that can occur for large images. That is, by adjusting the thinning ratio applied to the non-edge part depending on the size of an image (a character or a line image in the first embodiment), it is possible to achieve a high quality image with a sufficiently high density regardless of the image size.

Figure 4:
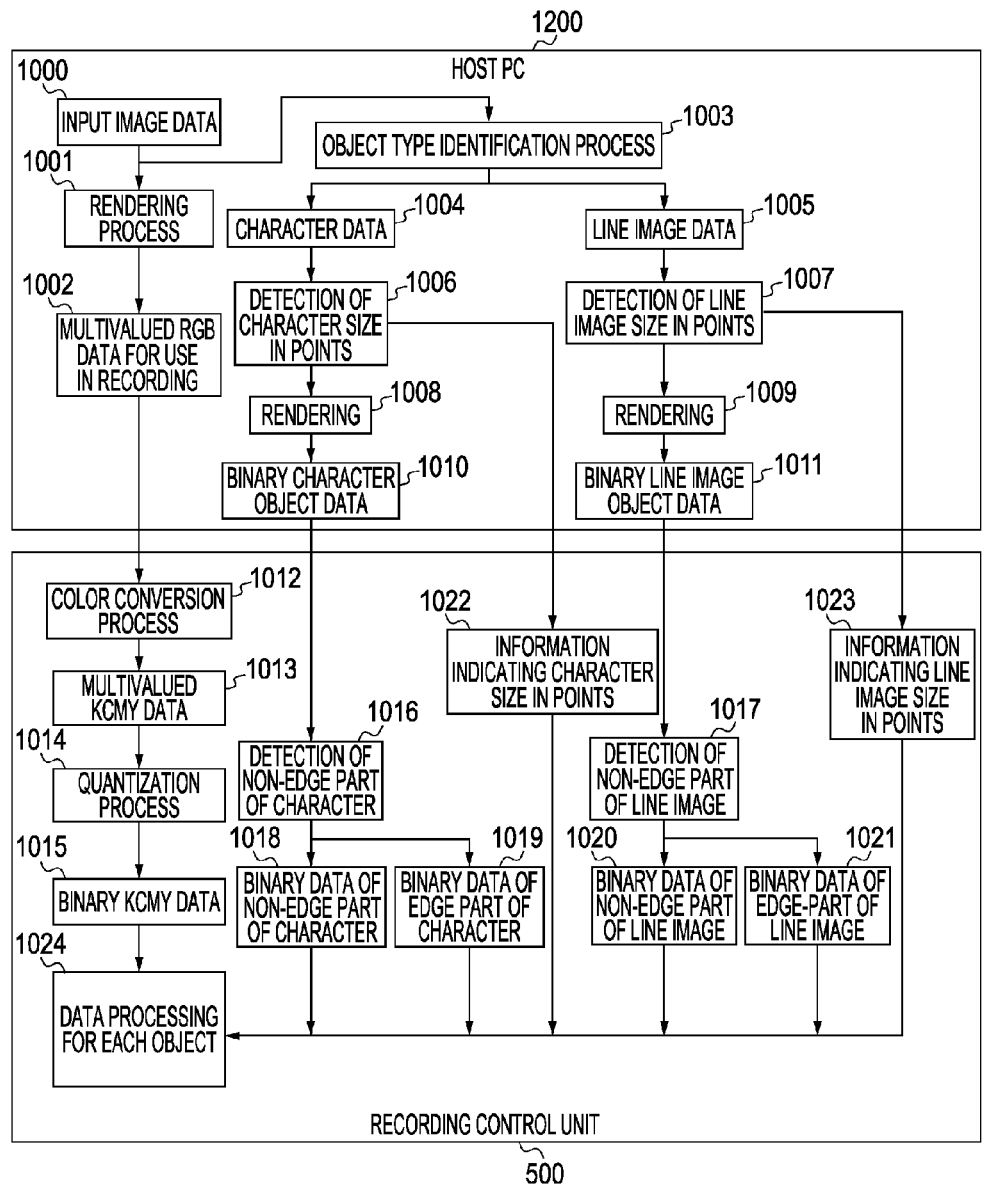
FIG. 4 is a block diagram illustrating an image processing system capable of performing image data processing according to an embodiment of the present invention.

FIG. 4 is a functional block diagram illustrating a configuration, relating to image data processing, of an image processing system including an ink-jet recording apparatus and a host PC. In the ink-jet recording apparatus, the recording control unit 500 processes data received via the interface shown in FIG. 2 from the host PC 1200 in which a printer driver is installed.

In the host PC 1200, input image data 1000 is produced by an application program. The input image data 1000 includes information indicating the type of each image element (hereinafter such information will be referred to simply as attribute information associated with the image) and information indicating the point number of each character or line image. First, the input image data 1000 is subjected to a rendering process 1001 with a resolution of 1200 dpi. As a result, multivalued RGB recording data 1002 is produced. In the present embodiment, the multivalued RGB recording data 1002 is 256-level data. Meanwhile, based on the input image data 1000, an object type identification process 1003 is performed to identify types of objects such as characters and line images that are image elements of an image to be recorded. For character data 1004 and line image data 1005 extracted in the object type identification process 1003, point number detection processes 1006 and 1007 are performed to acquire information indicating the point number from the printer driver. Subsequently, rendering processes 1008 and 1009 are performed on the character data 1004 and the line image data 1005 respectively. As a result, binary character object data 1010 and binary line image object data 1011 are produced which both have a resolution of 1200 dpi. The multivalued RGB recording data 1002 and binary object data 1011 and 1012 produced in the above-described manner are transmitted to the recording control unit 500. The information 1022 associated with the character point number and the information 1023 associated with the line image point number obtained in the respective point number detection processes 1006 and 1007 are also transmitted to the recording control unit 500.

In the recording control unit 500, a color conversion process 1012 is performed to convert the multivalued RGB recording data 1002 into multivalued (256-level) KCMY data 1013. Subsequently, a quantization process 1014 is performed to quantize (binarize) the multivalued (256-level) KCMY data 1013 (for example, using an error diffusion method). As a result, binary KCMY data 1015 with a resolution of 1200 dpi is produced. On the other hand, the binary character object data 1010 and the binary line image object data 1011 transmitted to the recording control unit 500 are respectively subjected to non-edge part detection processes 1016 and 1017. As a result, binary data 1018 of the non-edge part of the character, binary data 1019 of the edge part of the character, binary data 1020 of the non-edge part of the line image, and binary data 1021 of the edge part of the line image are produced.

Finally, an object-by-object data process 1024 is performed as described in further detail below based on the binary KCMY data 1015, the binary data 1018 of the non-edge part of the character, the binary data 1019 of the edge part of the character, the binary data 1020 of the non-edge part of the line image, the binary data 1021 of the edge part of the line image, the information 1022 indicating the character point number, and the information 1023 indicating the line image point number.

Figure 5A:
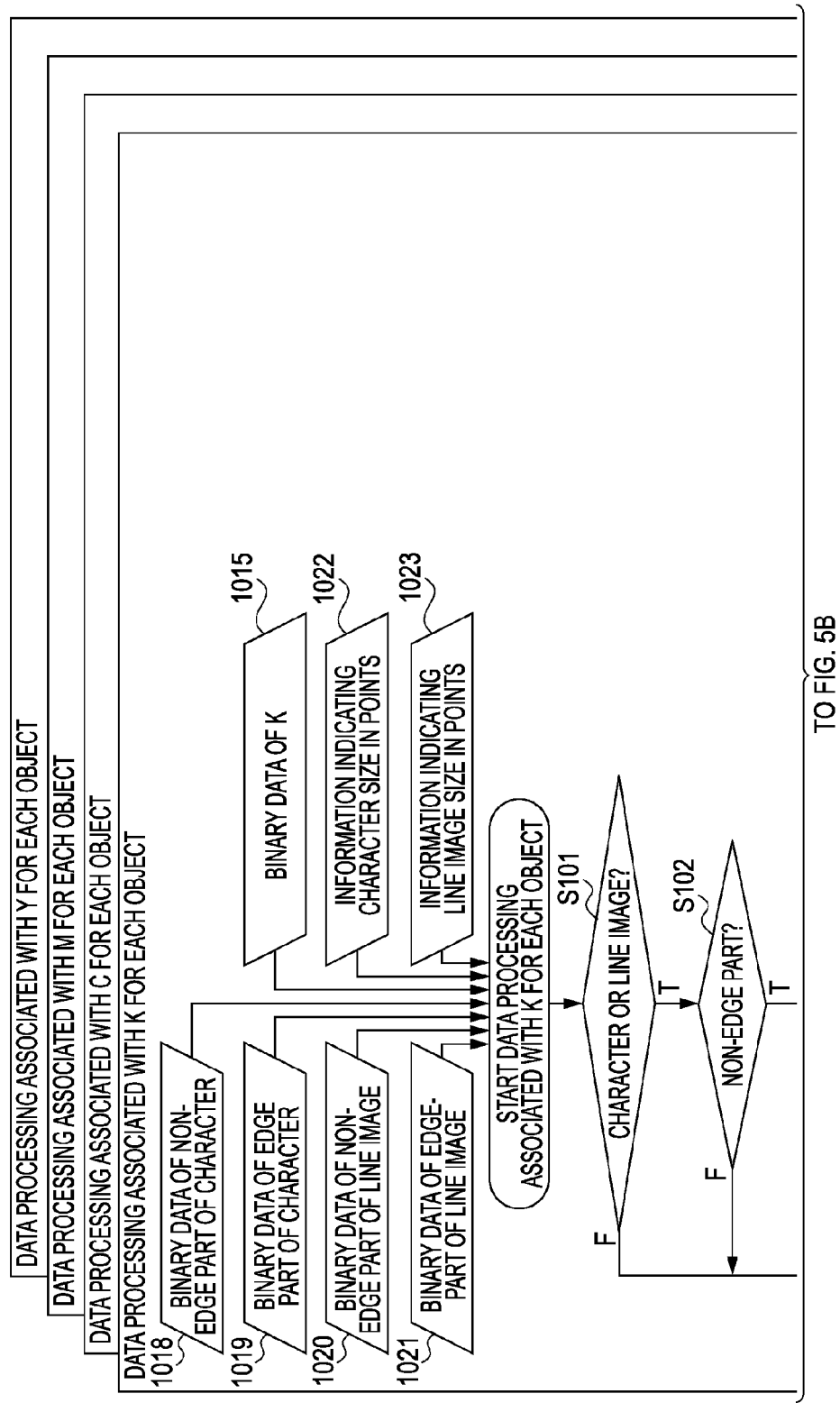

FIGS. 5A to 5B together form a flow chart illustrating details of the object-by-object data process 1024 shown in FIG. 4. In this object-by-object data process 1024, a similar process is performed for each color (KCMY). In the following description, only the object-by-object data process for color K is described and descriptions of the process for other colors are omitted.

As shown in FIG. 4 and FIG. 5A, the object-by-object data process for K is started in response to inputting of the binary data 1018 of the non-edge part of the character, the binary data 1019 of the edge part of the character, the binary data 1020 of the non-edge part of the line image, the binary data 1021 of the edge part of the line image, binary data 1015 of K, the information 1022 indicating the character point number, and the information 1023 indicating the line image point number.

First, based on image attribute information, a determination is made as to whether a pixel of interest is in an image of a character type or of a line image type (step S101). Subsequently, for the image data determined to be of the character type or of the line image type, a determination is made as to whether the image data is of a non-edge part (step S102). Subsequently, for the image determined to be in the non-edge part, a determination is made as to whether the image is of the character type (step S103). For the image determined to be of the character type, information indicating the character point number is acquired (step S104). Subsequently, a determination is made for each character as to whether the point number is smaller than 10 (threshold value) or greater than or equal to 10 (step S105). In a case where it is determined that the point number is smaller than 10, a thinning mask with a thinning ratio of 75% is selected as a mask to be applied to character data with the size smaller than 10 points (step S106). As a result of selecting the thinning mask, the thinning ratio is determined as described above. Subsequently, the character data is thinned using the selected 75% thinning mask thereby producing thinned character data of K for the pixel of interest. A set of data is obtained by performing the above-described process on a plurality of pixels. Hereinafter, the set of such data is referred to as thinned character data (I) of K (step S107). On the other hand, in a case where it is determined that the point number is greater than or equal to 10, a 50% thinning mask is selected as a mask to be applied to character data with a size greater than or equal to 10 points (step S108). Subsequently, the character data is thinned using the selected 50% thinning mask thereby producing thinned character data of K for the pixel of interest. A set of data is obtained by performing the above-described process on a plurality of pixels. Hereinafter, the resultant set of such data is referred to as thinned character data (II) of K (step S109). The thinned character data (I) of K produced in step S107 and the thinned character data (II) of K produced in step S109 are combined to produce combined character data of K (step S110).

Thereafter, information is referred to in terms of the line image point number associated with the image determined in step S105 as the line image (step S111). A determination is then made for each line image as to whether the point number is smaller than 4 (threshold value) or greater than or equal to 4 (step S112). In a case where it is determined that the point number is smaller than 4, a 75% thinning mask is selected as a mask to be applied to the line image data with the size smaller than 4 points (step S113). Subsequently, the line image data is thinned using the selected 75% thinning mask thereby producing thinned line image data of K for the pixel of interest. A set of data is obtained by performing the above-described process on a plurality of pixels. Hereinafter, the resultant set of such data is referred to as thinned line image data (I) of K (step S114). On the other hand, in a case where it is determined that the point number is greater than or equal to 4, a 50% thinning mask is selected as a mask to be applied to line image data with a size greater than or equal to 4 points (step S115). Subsequently, the line image data is thinned using the selected 50% thinning mask thereby producing thinned line image data of K for the pixel of interest. A set of data is obtained by performing the above-described process on a plurality of pixels. Hereinafter, the resultant set of such data is referred to as thinned line image data (II) of K (step S116). The thinned line image data (I) of K produced in step S114 and the thinned line image data (II) of K produced in step S116 are combined to produce combined line image data of K (step S117).

In a case where it is determined in step S101 that the attribute of the image is neither the character type nor the line image type (that is, the image attribute is undefined), a set of data obtained from all pixels included in this image is defined as undefined-type data of K. In a case where it is determined in step S102 that the pixel of interest is in an edge-part, a set of data obtained from all pixels located in the edge-part is defined as edge part data of the character/line image of K (step S118).

Combined data of K (recording data of K) is then produced (step S119) by combining character/line image edge part data of K, undefined-type data of K, combined character data of K combined line image data of K, which were produced in steps S110, S117, and S118.

The above-described object-by-object data process for K is also performed for C, M, and Y. Thereafter, the recording data of each color is transmitted via the head driver 405 to corresponding one of the recording heads 201 to 204, and the recording heads 201 to 204 performs recording.

Figure 6A:
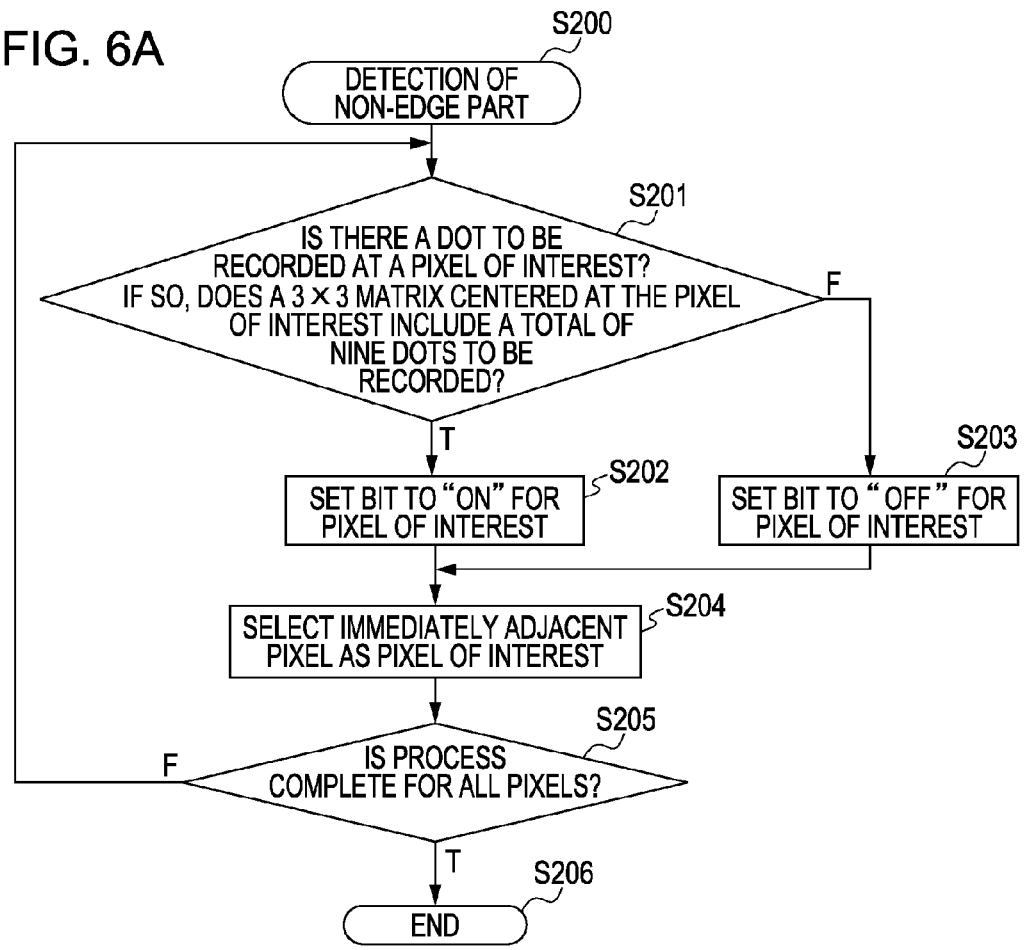
FIGS. 6A to 6C are diagrams illustrating a non-edge part detection process.
Figure 6B:
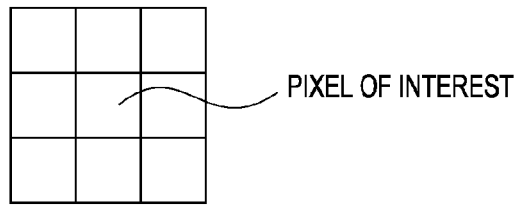
Figure 6C:
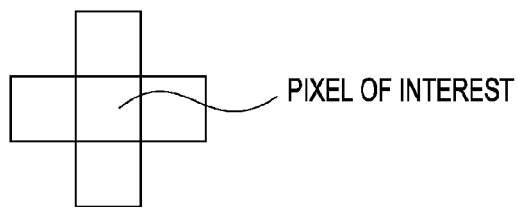

FIG. 6A is a flow chart illustrating details of the process of detecting non-edge parts (1016, 1017) shown in FIG. 4. FIGS. 6B and 6C each illustrate an example of a matrix centered at a pixel of interest for use in the process of detecting non-edge parts. First, a determination is made as to whether there is data representing a dot to be recorded at a pixel of interest of image data, and there are nine dots to be recorded in a 3×3 matrix centered at the pixel of interest (step S201). If it is determined that the matrix includes nine dots to be recorded, the bit of the pixel of interest is set to "ON" (step S202). On the other hand, if the total number of dots to be recorded in the matrix is not equal to 9, the bit of the pixel of interest is set to "OFF" (step S203). Thereafter, a pixel adjacent in the scanning direction to the current pixel of interest is selected from the image data as a new pixel of interest (step S204). The process described above is performed repeatedly until it is determined (in step S205) that the detection process is complete for all pixels in the image data. If it is determined that the process is complete, the process of detecting the non-edge parts of the image data is ended (step S206), otherwise the processing flow returns to step S201 to repeat the process described above.

FIG. 6B illustrates a matrix that is assumed to be used in the process described above. Note that the matrix used in the detection process is not limited to that shown in FIG. 6B. For example, a matrix including a pixel of interest and four adjacent pixels located as shown in FIG. 6C may be employed. In this case, a determination is made as to whether the matrix includes five dots to be recorded. If the matrix include five dots to be recorded, the pixel of interest is determined in the non-edge part.

Figure 7A:
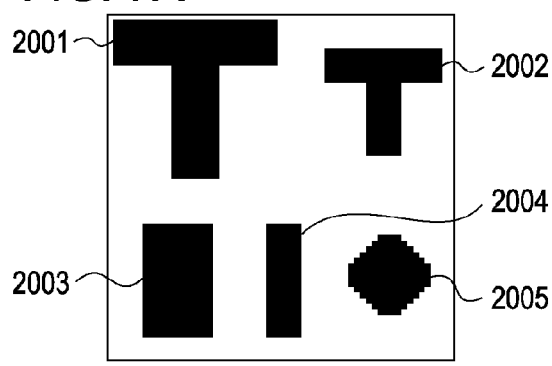
FIGS. 7A to 7G are diagrams illustrating a non-edge part detection process according to an embodiment of the present invention.
Figure 7B:
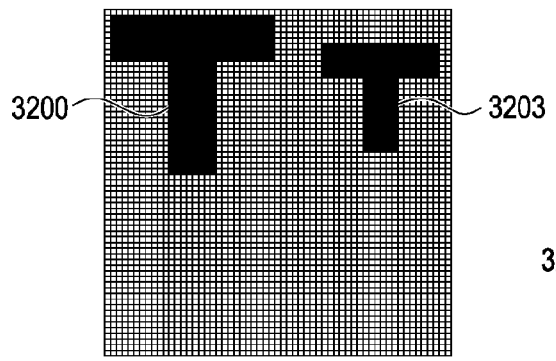
Figure 7E:
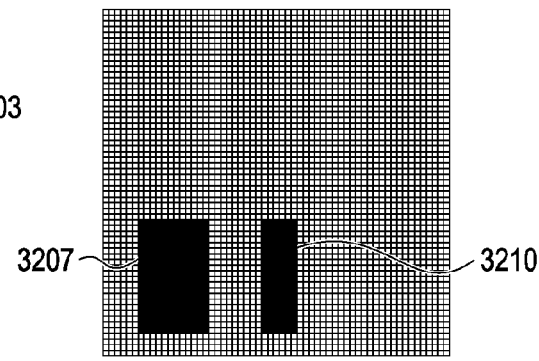
Figure 7C:
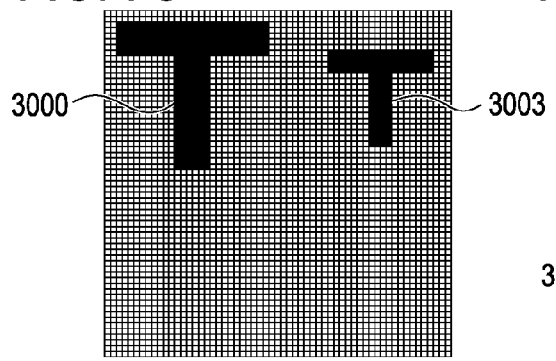
Figure 7F:
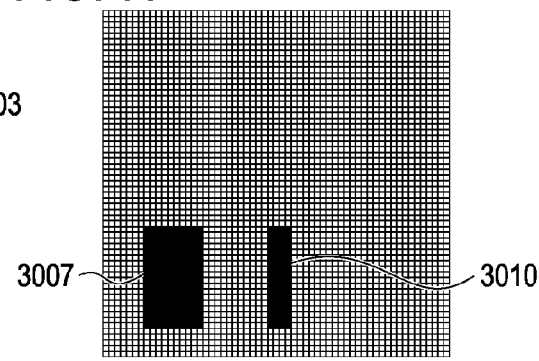
Figure 7D:
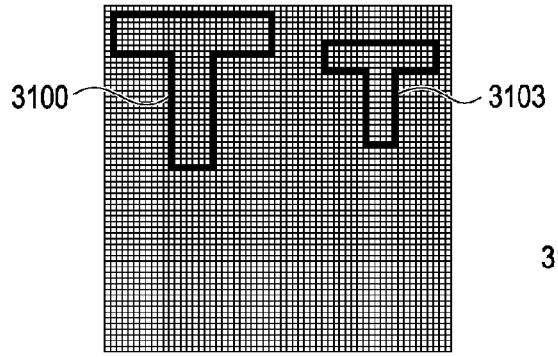
Figure 7G:
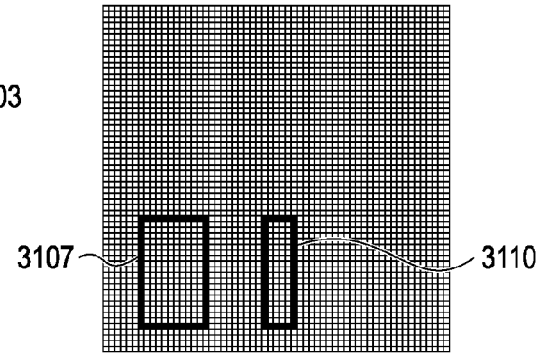

The non-edge part detection process, the thinning process, and the recording data production process described above with reference to FIGS. 4, 5A to 5B, and 6A to 6C will be described in further detail with reference to FIGS. 7A to 7G, 8A to 8J, and 9A to 9E. Note that the following description is for K although a similar process is performed for C, M, and Y. FIGS. 7A to 7G illustrate an example of a process of detecting a non-edge part. FIG. 7A illustrates binary data 1015 of K including a character 2001 with a size of 12 points, a character 2002 with a size of 7 points, a line image 2003 with a size of 5 points, a line image 2004 with a size of 2 points, and an image 2005 of undefined type. FIG. 7B illustrates binary character object data 3200 and 3203. FIG. 7C illustrates binary data 3000 and 3003 of non-edge parts of characters. FIG. 7D illustrates binary data 3100 and 3103 of edge parts of the characters. FIG. 7E illustrates binary data 3207 and 3210 of line image objects. FIG. 7F illustrates binary data 3007 and 3010 of non-edge parts of the line images. FIG. 7G illustrates binary data 3107 and 3110 of edge parts of the line images. The data shown in FIG. 7C and the data shown in FIG. 7D are produced from the data shown in FIG. 7B as follows. That is, the non-edge part detection process is performed in the manner described above with reference to FIGS. 6A to 6C for all pixels of the binary data 3200 and 3203 of the character objects shown in FIG. 7B while selecting a pixel of interest one by one by shifting the position of the pixel of interest to an adjacent pixel. When the 3×3 matrix centered at the pixel of interest includes a total of nine dots to be recorded, the bit of this pixel of interest is set to "ON". The binary data 3000 and 3003 of non-edge parts of the characters shown in FIG. 7C are each given by a set of pixels corresponding to the "ON" bits. Thereafter, by determining exclusive OR of the binary data 3000 and 3003 of the non-edge parts of the characters produced in the above-described manner and the binary data 3200 and 3203 of the character objects, the binary data 3100 and 3103 of the edge parts of the characters shown in FIG. 7D are produced. Similarly, from the binary data of line image objects shown in FIG. 7E, the binary data 3007 and 3010 of the non-edge parts of the line images shown in FIG. 7F and the binary data 3107 and 3110 of the edge parts of the line images shown in FIG. 7G are produced.

Note that the above-described process is performed only on characters and line images, but the process is not performed on the undefined-type image 2005. In the example described above, the edge part is detected as an edge line with a width of one pixel and the non-edge part is detected as a part formed by pixels other than the pixels on the edge line. Alternatively, the edge part may be detected as an edge line with a width of a plurality of pixels. In the case where the edge part is detected as an edge line with a width of a plurality of pixels, the edge part may be detected by performing the non-edge part detection process repeatedly on non-edge part data obtained in a previous non-edge part detection process. Instead of detecting the non-edge part, the edge part may be detected to produce the edge part data and the non-edge part data.

Figure 8A:
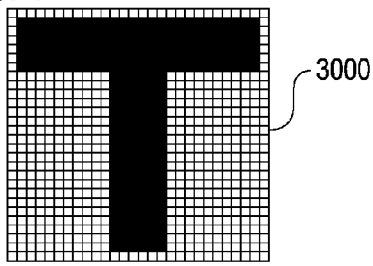
FIGS. 8A to 8J are diagrams illustrating a thinning process performed on non-edge part data according to an embodiment of the present invention.
Figure 8F:
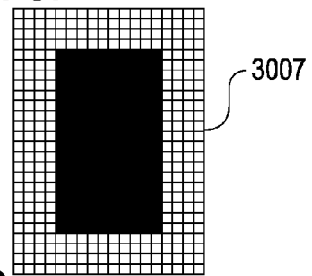
Figure 8B:
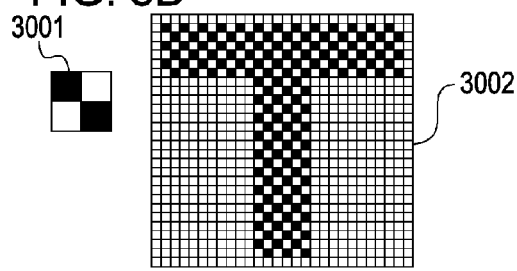
Figure 8G:
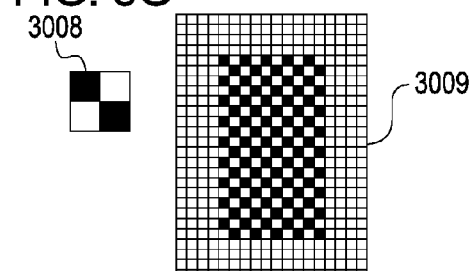
Figure 8C:
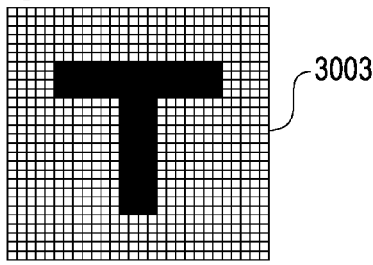
Figure 8H:
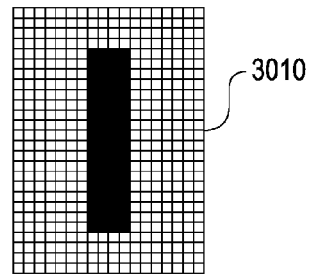
Figure 8D:
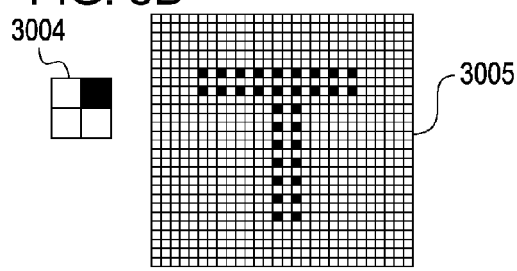
Figure 8I:
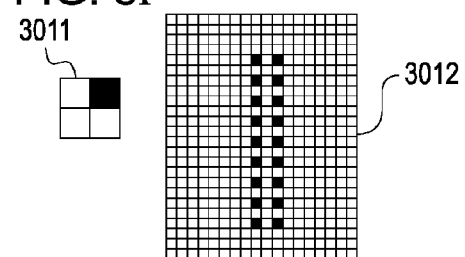
Figure 8E:
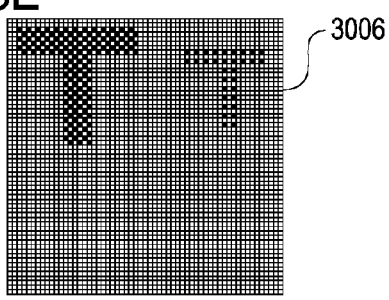

FIGS. 8A to 8J are diagrams illustrating a process of thinning non-edge part data of a character and a line image, and a process of producing combined character data and combined line image data. More specifically, FIG. 8A illustrates the binary data 3000 of the non-edge part of the character with a size greater than or equal to 10 points shown in FIG. 7C. In this case, the size is greater than or equal to 10 points, and thus the thinned character data (I) 3002 shown in FIG. 8B is produced by calculating the logical AND of the binary data 3000 of the non-edge part of the character and the 50% thinning mask 3001. FIG. 8C illustrates the binary data 3003 of the non-edge part of the character with a size smaller than 10 points shown in FIG. 7C. In this case, the size is smaller than 10 points, and thus the thinned character data (II) 3005 shown in FIG. 8D is produced by calculating the logical AND of the binary data 3003 of the non-edge part of the character and the 75% thinning mask 3004. Furthermore, by calculating the logical OR of the thinned character data (I) 3002 and the thinned character data (II) 3005, the combined character data 3006 of K shown in FIG. 8E is produced.

Figure 8J:
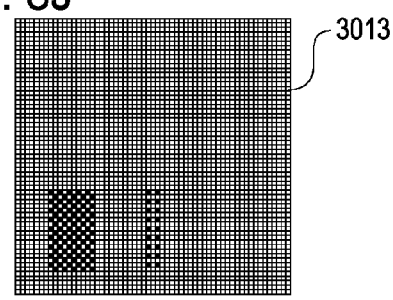

FIG. 8F illustrates the binary data 3007 of the non-edge part of the line image shown in FIG. 7E, which has a size greater than or equal to 4 points. In this case, the size is greater than or equal to 4 points, and thus the thinned line image data (I) 3009 shown in FIG. 8G is produced by calculating the logical AND of the binary data 3007 of the non-edge part of the line image and the 50% thinning mask 3008. FIG. 8H illustrates the binary data 3010 of the non-edge part of the line image shown in FIG. 7E which has a size smaller than 4 points. In this case, the size is smaller than 4 points, and thus the thinned line image data (I) 3012 shown in FIG. 8I is produced by calculating the logical AND of the binary data 3010 of the non-edge part of the line image and the 75% thinning mask 3011. Furthermore, by calculating the logical OR of the thinned line image data (I) 3009 of K and the thinned line image data (II) 3012 of K, the combined line image data 3013 of K shown in FIG. 8J is produced.

Figure 9A:
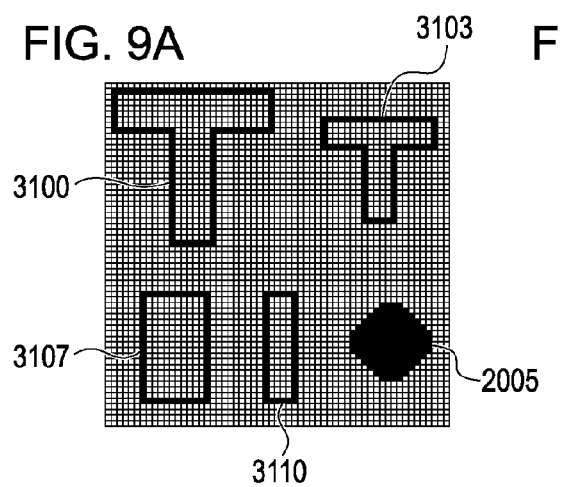
FIGS. 9A to 9E are diagrams illustrating a process of generating recording data according to an embodiment of the present invention.
Figure 9B:
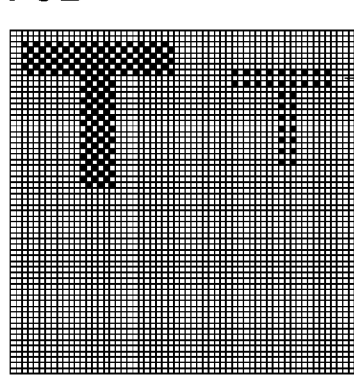
Figure 9C:
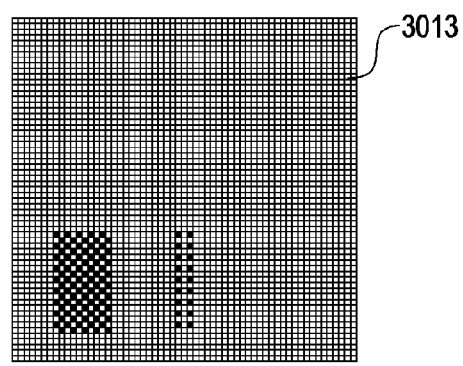
Figure 9D:
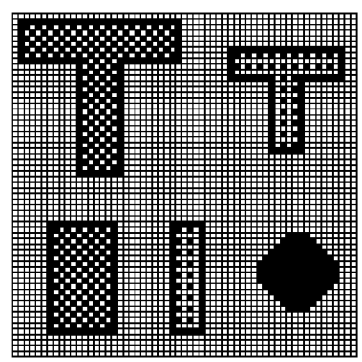

FIGS. 9A to 9E illustrate a process of producing recording data. FIG. 9A illustrates the edge part data of the character/line image shown in FIGS. 7D and 7G and also illustrates the image 2005 of undefined type shown in FIG. 7A. Recording data shown in FIG. 9D is produced by calculating the logical OR of the data shown in FIG. 9A, the combined character data 3006 shown in FIG. 9B (which is the same as that shown in FIG. 8E), and the combined line image data 3013 shown in FIG. 9C (which is the same as that shown in FIG. 8J). Note in step S119 in FIG. 5B, the recording data of K is produced in the above-described manner as with the recording data shown in FIG. 9D. In the process described above, the thinning ratio applied to the non-edge parts is set to be smaller for characters/line images with a relatively great size than for characters/line images with a relatively small size. This prevents degradation in image quality from occurring due to a reduction in image density which would occur if the thinning ratio is set to a constant value regardless of the image size as with the case described above with reference to FIGS. 3A to 3F.

In the present embodiment described above, adjustment of the thinning ratio depending on the size is performed for both types of image, i.e., the character type and line image type. Alternatively, adjustment of the thinning ratio may be performed only for images of the character type or only for images of line image type.

In the present embodiment, as described above, the thinning ratio applied to non-edge parts is varied depending on the size of images (characters or line images) thereby making it possible to form high-quality images with clear edge parts and with high densities in non-edge parts regardless of the size of the images (characters or line images). Furthermore, a reduction is achieved in the amount of recording materials used in forming the non-edge parts, which leads to a reduction in cost.

Second Embodiment

In the first embodiment described above, thinning is not performed for undefined-type data and for edge part data of characters and line images. In contrast, in a second embodiment described below, thinning is performed also for undefined-type data. Except for the above, the process is performed in a similar manner to the first embodiment.

Figure 9E:
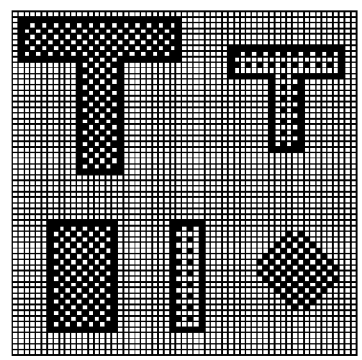

In the present embodiment, in the object type identification process 1003 in FIG. 4, an undefined type is also detected in addition to the character type and the line image type. For undefined-type data that is a set of data of pixels of interest determined in step S101 in FIG. 5A as being of undefined type, thinning is performed using a 50% thinning mask. Thereafter, the thinned undefined-type data, thinned character data, thinned line image data, and edge part data of character/line images are combined thereby producing recording data in which data is thinned not only for non-edge parts of characters and line images but also for undefined type data as shown in FIG. 9E.

In the example described above, the thinning ratio applied to the undefined-type data is set to 50%, which is the same as that applied to non-edge part data. Note that the thinning ratio is not limited to 50%, but the thinning ratio applied to undefined-type data may be set to a value different from that applied to non-edge part data as long as a reduction is achieved in the number of recording dots for the undefined-type data.

In the second embodiment, as described above, the thinning is performed not only on non-edge part data of characters and line images but also on undefined-type data, and thus a greater reduction in running cost is achieved than in the first embodiment.

Third Embodiment

In a third embodiment, in a case where a scaling factor (expansion/reduction ratio) is specified by the host PC 1200, the point number for characters and line images is calculated according to the specified scaling factor. According to the resultant point number information, the thinning ratio is then determined. Except for the above, the process is performed in a similar manner to the first embodiment, and thus the following discussion will focus on differences.

Figure 10:
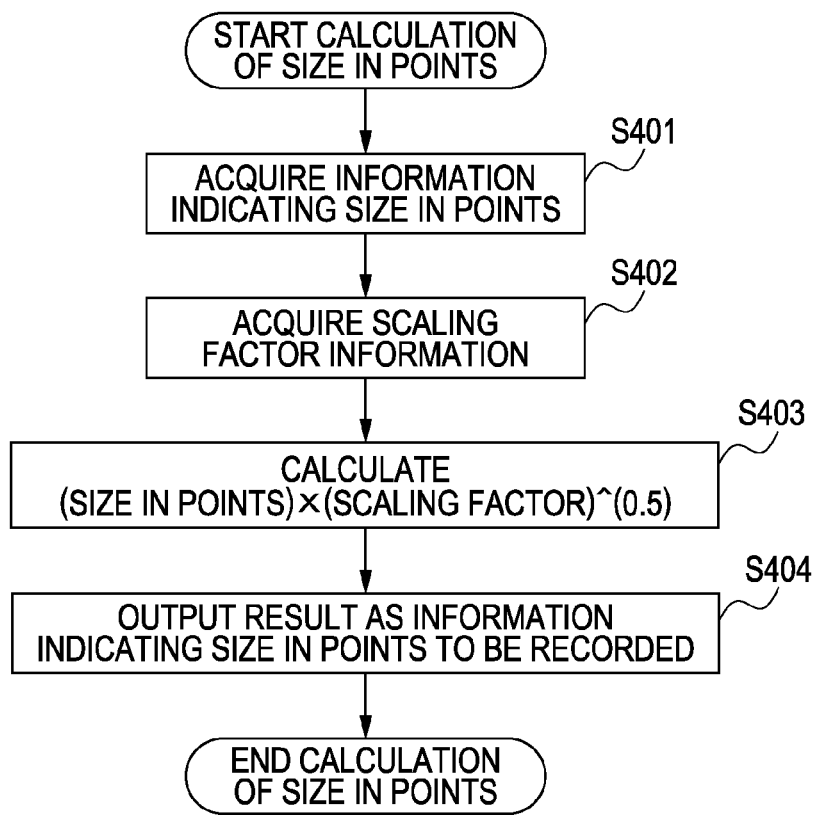
FIG. 10 is a flow chart illustrating a process of calculating a size in points according to an embodiment of the present invention.

FIG. 10 is a flow chart illustrating a process of calculating the point number according to the third embodiment. The process shown in this flow chart is performed by the printer driver in the host PC 1200 when the character point number information 1022 and the line image point number information 1023 shown in FIG. 4 are acquired. First, as in the first embodiment, information is acquired as to the point number detected in the character point number detection process 1006 and the line image point number detection process 1007 in FIG. 4 (step S401). Subsequently, information as to the scaling factor (expansion/reduction ratio) specified by the host PC 1200 is acquired (step S402). Subsequently, a calculation is performed according to a formula (1) shown below based on the information as to the point number acquired in step S401 and the information as to the scaling factor acquired in step S402 thereby determining the print point number used in recording (step S403).

$$\text{print point number} = \text{point number} \times (\text{scaling factor})^{0.5} \quad (1)$$

The information indicating the print point number calculated in step S403 is employed as character point number information 1022 and line image point number information 1023

(step S404). Thus, information (1022 and 1023) indicating the point number depending on the scaling factor is obtained.

The point number information (1022 and 1023) obtained in the above-described manner is transmitted to the recording control unit 500 in the ink-jet recording apparatus. The transmitted point number information (1022 and 1023) is used in the determining of the thinning ratio in the object-by-object data process (see FIGS. 5A and 5B). That is, in the object-by-object data process shown in FIGS. 5A and 5B, information as to the print point number obtained in step S404 shown in FIG. 10 is referred to in step S104 and S111 and a thinning mask is selected (i.e., the thinning ratio is determined) according to the print point number. Thus, in the present embodiment, it is possible to set the thinning ratio to an optimum value according to the point number depending on the scaling factor.

Fourth Embodiment

In a fourth embodiment, in the calculation of the point number of a character, font information is used in addition to the point number information of the character described in the first embodiment. That is, both the font information and the point number information associated with the character are acquired, and the point number of the character is determined according to the acquired information. According to the resultant character point number information, the thinning ratio to be applied to the non-edge part of the character is determined. Except for the above, the process is performed in a similar manner to the first embodiment, and thus the following discussion will focus on differences.

Figure 12:
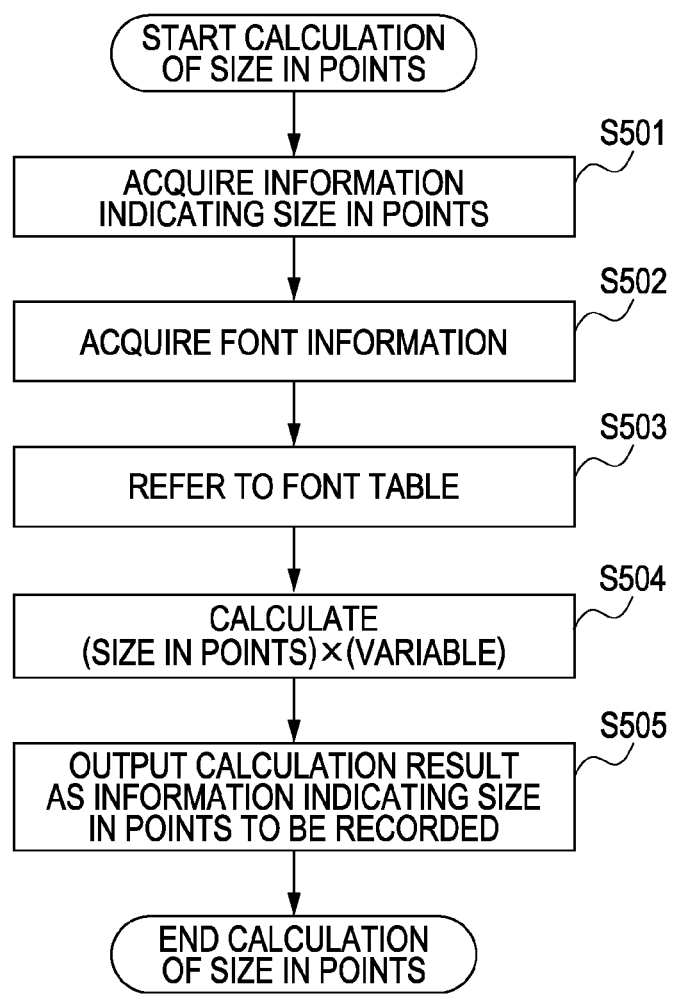
FIG. 12 is a flow chart illustrating a process of calculating a size in points according to an embodiment of the present invention.

FIG. 12 is a flow chart illustrating a process of calculating the point number according to the fourth embodiment. The process shown in this flow chart is performed by the printer driver in the host PC 1200 when the character point number information 1022 shown in FIG. 4 is acquired. First, as in the first embodiment, information is acquired as to the point number detected in the character point number detection process 1006 shown in FIG. 4 (step S501). Subsequently, font information associated with the character included in the input image data or font information associated with the character specified by the host PC 1200 is acquired (step S502). Subsequently, by referring to a font-variable table shown in FIG. 11, a variable corresponding to a font of the character to be processed is acquired (step S503). Note that the font-variable table shown in FIG. 11 defines the correspondence between the font and the variable such that when the character width is given by the product of the font and the variable, the resultant character width is constant regardless of the font. For example, the variable for the font "Gothic" is "2.5", the variable for the font "Century" is "1.6", and so on.

Subsequently, a calculation is performed according to a formula (2) shown below based on the information as to the point number acquired in step S501 and the information as to the variable acquired in step S503 thereby determining the print point number (step S504).

$$\text{print point number} = \text{point number} \times \text{variable} \qquad (2)$$

The information indicating the print point number calculated in step S504 is employed as character point number information 1022 (step S505). Thus, information 1022 indicating the point number depending on the font of the character is obtained.

The character point number information 1022 obtained in the above-described manner is transmitted to the recording control unit 500 in the ink-jet recording apparatus. The transmitted character point number information 1022 is used in determining the thinning ratio in the object-by-object data process (see FIGS. 5A and 5B). That is, in the object-by-object data process shown in FIGS. 5A and 5B, information as to the print point number obtained in step S505 shown in FIG. 12 is referred to in step S104 and a thinning mask is selected (i.e., the thinning ratio is determined) according to the print point number. Thus, in the present embodiment, even in a case where the character width varies depending on the font, it is possible to set the thinning ratio to an optimum value while achieving a similar character size regardless of the font.

Fifth Embodiment

In the first to fourth embodiments described above, the thinning ratio is determined according to the information associated with the point number of a character or a line image. In a fifth embodiment described below, the thinning ratio is determined according to image size information obtained from binary image data. Except for the above, the process is performed in a similar manner to the first embodiment, and thus the following discussion will focus on differences.

In the image processing system according to the fifth embodiment, information associated with the point number of characters or line images is not used. Therefore, the point number detection process (1006, 1007) shown in FIG. 4 is not performed, and point number information (1022, 1023) is not produced. In the image processing system according to the fifth embodiment, instead of the character point number detection process 1006 shown in FIG. 4, a character size detection process (A) is performed based on binary data 1010 of a character object described below. Thus, instead of the character point number information 1022, character size information 1022A is produced. Similarly, instead of the line image point number detection process 1007 shown in FIG. 4, a line image size detection process (A) is performed based on binary data 1011 of a line image object and thus line image size information 1023A is produced instead of the line image point number information 1023.

The character size detection process (A) is described in further detail below. This process is performed for each character surrounded by an edge part. First, for the binary data 1010 of a character object surrounded by an edge part, a pixel width in the main scanning direction (raster direction) is detected for each raster and a pixel width in the sub scanning direction (column direction) is detected for each column. That is, the number of dots to be recorded successively in the raster direction (the number of successive dots) is detected for each raster, and the number of dots to be recorded successively in the column direction is detected for each column. Next, the mode is determined from a plurality of numbers of successive dots detected in the above-described manner. The information indicating the resultant mode is employed as the character size information 1022A described above. The character size information 1022A is transmitted to the recording control unit 500 and is used in the object-by-object data process (see FIGS. 5A and 5B).

In step S104 in FIG. 5B, instead of referring to the character point number, the character size information 1022A is referred to. Subsequently, in step S105, a determination is made as to whether the mode indicated by the character size information 1022A is greater than or equal to a predetermined value (for example, 14). If it is determined that the mode is greater than or equal to the predetermined value, the process proceeds to step S108. In step S108, a thinning mask with a low thinning ratio (a 50% thinning mask) is selected (step S108). On the other hand, in a case where it is determined in step S105 that the mode is smaller than the predetermined value, the process proceeds to step S106. In step S106, a thinning mask with a high thinning ratio (a 75% thinning mask) is selected (step S106). Thus, it is possible to properly set the thinning ratio depending on the character size without using the character point number information.

The line image size detection process (A) is similar to the character size detection process (A) described above except that the process is performed not on a character but on a line image (i.e., line image size information 1023A is produced from the binary data 1011 of the line image object), and thus the description thereof is omitted. Note that the predetermined value (i.e., the threshold value) according to which the mask is selected may be different for characters and line images.

In the example described above, the number of successive dots is detected for binary data (1010, 1011) of a character/line image object surrounded by an edge part. Alternatively, the number of successive dots may be detected from binary data (1018, 1020) of a non-edge part of the character/line image. In this case, the character size information 1022A or the line image size information 1023A is produced in the recording control unit 500 from the binary data 1018 of the non-edge part of the character or the binary data 1020 of the non-edge part of the line image.

The number of successive dots may be detected only in the main scanning direction (raster direction) or in the sub scanning direction (column direction). As for the size information used in the determination of the thinning mask (i.e., used in the determination of the thinning ratio), the average value or the maximum value of numbers of successive dots may be used instead of the mode of the numbers of successive dots. Instead of detecting the mode, the average value, or the maximum value for each image (each character or line image) surrounded by an edge part, the detection may be performed for each image block including a string of a plurality of characters.

Sixth Embodiment

In the fifth embodiment described above, the mode, the average value, or the maximum value detected from binary image data is used as the image size information. In contrast, in a sixth embodiment described below, the total number of dots of binary image data surrounded by an edge part is used as image size information. That is, in the sixth embodiment, instead of the character size detection process (A) according to the fifth embodiment, a character size detection process (B) is performed to detect the total number of dots forming a character. Information indicating the total number of dots detected in the character size detection process (B) is referred to as character size information B. According to this character size information B, a thinning mask is selected (i.e., a thinning ratio is determined). For a line image, a process is performed in a similar manner. That is, instead of the line image size detection process (A) according to the fifth embodiment, a line image size detection process (B) is performed to detect the total number of dots forming a line image. Information indicating the total number of dots detected in the line image size detection process (B) is referred to as line image size information B. According to this line image size information B, a thinning mask is selected (i.e., a thinning ratio is determined). Except for the above, the process is performed in a similar manner to the fifth embodiment, and thus the following discussion will focus on differences from the fifth embodiment.

The character size detection process (B) is described in further detail below. First, from the binary data 1010 of the character object surrounded by an edge part, the total number of dots forming this data is detected. The obtained information indicating the total number of dots is employed as the character size information 1022B described above. This character size information 1022B is transmitted to the recording control unit 500 and is used in the object-by-object data process (see FIGS. 5A and 5B).

In step S104 in FIG. 5B, instead of referring to the character point number, the character size information 1022B is referred to. Subsequently, in step S105, a determination is made as to whether the total number of dots indicated by the character size information 1022B is greater than or equal to a predetermined value (for example, 200). If it is determined that the total number of dots is greater than or equal to the predetermined value, the process proceeds to step S108. In step S108, a thinning mask with a low thinning ratio (a 50% thinning mask) is selected (step S108). On the other hand, in a case where it is determined in step S105 that the total number of dots is smaller than the predetermined value, the process proceeds to step S106. In step S106, a thinning mask with a high thinning ratio (a 75% thinning mask) is selected (step S106). Thus, it is possible to properly set the thinning ratio depending on the character size without using the character point number information.

The line image size detection process (B) is similar to the character size detection process (B) described above except that the process is performed not on characters but on a line image (i.e., line image size information 1023B is produced from the binary line image object data 1011), and thus the description thereof is omitted. Note that the predetermined value (i.e., the threshold value) according to which the mask is selected may be different between characters and line images.

In the example described above, the total number of dots is detected from binary character/line image object data (1010, 1011) surrounded by an edge part, the total number of dots may be detected from binary character/line image non-edge part data (1018, 1020). The total number of dots may be detected for each character or for each string of a plurality of characters, instead of for each image (each character or line image) surrounded by an edge part.

Seventh Embodiment

In the first to sixth embodiments described above, an image type is determined based on attribute information included in input image data. The type of an image may be determined according to other methods. That is, a determination as to whether an image is of character type or of line image type may be made using other known methods. That is, in the present invention, input image data does not necessarily need to include attribute information.

Eighth Embodiment

In the first to seventh embodiments described above, the process of determining the thinning ratio depending on the image size is performed only for images of the character type or of the line image type. However, in the present invention, the process may be performed for other types of images. That is, the process of determining the thinning ratio depending on the image size may be performed not only for images of the character types and the line image types but also for images of other types. Conversely, the process of determining the thinning ratio depending on the image size may be performed only for images of a type other than the character type and the line image type.

In a case where the thinning ratio is determined for an image of a type other than the character type and the line image type, an image surrounded by an edge part is first extracted. Thereafter, a parameter (the mode, the average value, the total number of dots, etc.) is acquired for the extracted image as in the fifth or sixth embodiment. By using the acquired parameter as size information, the thinning ratio for a non-edge part of the image may be determined. Note that also in the present embodiment, as in the embodiments described above, the thinning ratio is set to be smaller for images with sizes greater than or equal to a predetermined value than for images with sizes smaller than the predetermined value.

A user may select or specify types of images that are to be subjected to the process of determining the thinning ratio. This allows the thinning process to be performed in a more suitable manner depending on a requirement of the user.

Other Embodiments

In the first to eighth embodiments described above, the ink-jet recording apparatus is employed as the image recording apparatus. However, in the present invention, the image recording apparatus is not limited to the ink-jet recording apparatus. For example, an electrophotographic printer using toner as a recording material may be employed.

In the first to eighth embodiments described above, it is assumed, by way of example, that the amount of recording material (such as ink or toner) used to form a non-edge part of an image is reduced by reducing the number of binary recording data used to form a non-edge part of an image (i.e., by thinning recording data). However, the present invention is not limited to this method. For example, the amount of recording material may be reduced by reducing the value (density value) of multivalued data forming a non-edge part of an image. The value of multivalued data approximately corresponds to the amount of recording material used. Therefore, by setting a reduction ratio at which to reduce the value of multivalued data, it is possible to reduce the amount of recording material used corresponding to the reduction ratio.

Note that the setting of the reduction ratio at which to reduce the number of binary recording data (the thinning ratio for the binary recording data) or setting of the reduction ratio at which to reduce the value of multivalued data corresponds to setting of the reduction ratio at which to reduce the amount of recording material. Therefore, the reduction ratio at which to reduce the amount of recording material used to form a non-edge part of an image may be determined according to size information associated with the image, and a reduction process may be performed to reduce the amount of recording material used to form the non-edge part of the image according to the determined reduction ratio, whereby it is possible to optimize the amount of recording material used to form the non-edge part depending on the image size.

In the first to eighth embodiments described above, the process on image data is performed cooperatively by two apparatuses, i.e., the ink-jet recording apparatus used as the image recording apparatus and the host PC used as the data supply apparatus. However, the present invention is not limited to this configuration. For example, the image recording apparatus may perform all process shown in FIGS. 5A and 5B, or, conversely, the data supply apparatus may perform all process shown in FIGS. 5A and 5B. That is, what is necessary is to perform the above-described process on image date in the image processing system including the image recording apparatus and the data supply apparatus.

In the case where the image recording apparatus performs the essential part of the image processing according to any embodiment of the present invention (that is, in the case where the image recording apparatus performs the process of determining the thinning ratio to be applied to a non-edge part of an image according to size information associated with the image), the image recording apparatus functions as the image processing apparatus according to the embodiment of the present invention. On the other hand, in the case where the data supply apparatus performs the essential part of the image processing according to any embodiment of the present invention (that is, in the case where the data supply apparatus performs the process of determining the thinning ratio to be applied to a non-edge part of an image according to size information associated with the image), the data supply apparatus (host PC) functions as the image processing apparatus according to the embodiment of the present invention.

The present invention may also be realized by executing a process described below. That is, software (a program) that realizes the functions according to any embodiment described above may be supplied to a system or an apparatus via a network or a storage medium, and a computer (or a Central Processing Unit (CPU), a Microprocessor Unit (MPU), or the like) disposed in the system or the apparatus may read the software (the program) and execute it thereby executing the process.

Any of a wide variety of computer-readable storage media may be used as the storage medium. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-236437 filed Oct. 13, 2009, which is hereby incorporated by reference herein in its entirety.

What is claimed is:

1. An image processing apparatus comprising:
an acquisition unit configured to acquire information associated with a size of an object in an image;
a determination unit configured to determine a thinning ratio at which data of a non-edge part of the object is to be thinned according to the information acquired by the acquisition unit; and
a thinning unit configured to thin the data of the non-edge part according to the thinning ratio determined by the determination unit,
wherein the thinning unit determines the thinning ratio such that the thinning ratio applied when the object has a first size is smaller than the thinning ratio applied when the object has a second size smaller than the first size.

2. The image processing apparatus according to claim 1, further comprising:
an identification unit configured to identify the object in the image,
wherein the acquisition unit is configured to, in a case where the object in the image is identified as a character, acquire information associated with a size of the character,
and wherein the determination unit is configured to determine the thinning ratio at which data of a non-edge part of the character is to be thinned according to the information associated with the size of the character.

3. The image processing apparatus according to claim 2, wherein the information associated with the size of the character is information associated with a point number of the character.

4. The image processing apparatus according to claim 1, further comprising:
an identification unit configured to identify the object in the image,
wherein the acquisition unit includes a unit configured to, in a case where the object in the image is identified as a line image, acquire information associated with a width of the line image, and wherein the determination unit includes a unit configured to determine the thinning ratio at which data of a non-edge part of the line image is to be thinned according to the information associated with the width of the line image.

5. The image processing apparatus according to claim 4, wherein the information associated with the width of the line image is information associated with a point number of the line image.

6. An image processing apparatus comprising:
an identification unit configured to identify an object in an image;
an acquisition unit configured to, in a case where the identification unit identifies the object in the image as a character or a line image, acquire information associated with a size of the object identified as the character or the line image;
a determination unit configured to determine a thinning ratio at which data of a non-edge part of the object is to be thinned according to the information acquired by the acquisition unit; and
a thinning unit configured to thin the data of the non-edge part according to the thinning ratio determined by the determination unit,
wherein the thinning ratio is determined such that when the size of the object is greater than or equal to a predetermined particular size, the thinning ratio is set to be smaller than when the size of the object is smaller than the predetermined particular size.

7. An image processing apparatus comprising:
an acquisition unit configured to acquire information associated with a size of an object in an image;
a determination unit configured to determine a reduction ratio at which the amount of a recording material used to form a non-edge part of the object is to be reduced according to the information acquired by the acquisition unit; and
a reduction processing unit configured to reduce the amount of the recording material used to form the non-edge part of the object according to the reduction ratio determined by the determination unit,
wherein the reduction ratio is determined such that when the size of the object is greater than or equal to a predetermined particular size, the reduction ratio is set to be smaller than when the size of the object is smaller than the predetermined particular size.

8. An image processing method comprising:
acquiring information associated with a size of an object in an image;
determining a thinning ratio at which data of a non-edge part of the object is to be thinned according to the acquired information; and
thinning the data of the non-edge part according to the determined thinning ratio,
wherein the thinning ratio is determined such that the thinning ratio applied when the object has a first size is smaller than the thinning ratio applied when the object has a second size smaller than the first size.

9. An image processing method comprising:
identifying an object in an image;
in a case where the attribute of the object is identified as a character or a line image, acquiring information associated with a size of the object identified as the character or the line image;
determining a thinning ratio at which data of a non-edge part of the object is to be thinned according to the acquired information; and
thinning the data of the non-edge part according to the determined thinning ratio,
wherein the thinning ratio is determined such that the thin ratio applied when the object has a first size is smaller than the thinning ratio applied when the object has a second size smaller than the first size.

10. An image processing method comprising:
acquiring information associated with a size of an object in an image;
determining a reduction ratio at which the amount of a recording material used to form a non-edge part of the object is to be reduced according to the acquired information; and
reducing the amount of the recording material used to form the non-edge part of the object according to the determined reduction ratio,
wherein the reduction ratio is determined such that when the size of the object is greater than or equal to a predetermined particular size, the reduction ratio is set to be smaller than when the size of the object is smaller than the predetermined particular size.

11. The image processing apparatus according to claim 1, wherein the object indicates a character or line, and the thinning unit does not thin data of an object that does not indicate the character or line.

12. The image processing apparatus according to claim 1, wherein the acquisition unit is included in a host computer, and the determination unit and the thinning unit are included in a printer.

\* \* \* \* \*